US012591148B2

(12) United States Patent (10) Patent No.: US 12,591,148 B2
Spremulli et al. (45) Date of Patent: Mar. 31, 2026

(54) EYEGLASS LENS WITH DECORATIVE ELEMENT

(71) Applicant: LUXOTTICA S.R.L., Agordo (IT)

(72) Inventors: Vincenzo Spremulli, San Mauro Torinese (IT); Cristina Guagliumi, Lissone (IT)

(73) Assignee: LUXOTTICA S.R.L., Agordo (IT)

( * ) Notice: Subject to any disclaimer, the term of this patent is extended or adjusted under 35 U.S.C. 154(b) by 324 days.

(21) Appl. No.: 18/259,096

(22) PCT Filed: Dec. 21, 2021

(86) PCT No.: PCT/IB2021/062098
§ 371 (c)(1),
(2) Date: Jun. 23, 2023

(87) PCT Pub. No.: WO2022/137113
PCT Pub. Date: Jun. 30, 2022

(65) Prior Publication Data
US 2024/0069360 A1 Feb. 29, 2024

(30) Foreign Application Priority Data
Dec. 24, 2020 (IT) ........................ 102020000032372

(51) Int. Cl.
*G02C 7/02* (2006.01)
(52) U.S. Cl.
CPC .................................... *G02C 7/021* (2013.01)
(58) Field of Classification Search
CPC .............. G02C 7/021; B29D 11/00009; B29D 11/0073; B29D 11/00817; B29D 11/00317

USPC ............................................. 351/159, 159.69
See application file for complete search history.

(56) References Cited

U.S. PATENT DOCUMENTS

| | | | |
|---|---|---|---|
| 2002/0097373 A1* | 7/2002 | Thiele | G02C 5/126 |
| | | | 351/87 |
| 2004/0084790 A1 | 5/2004 | Blum et al. | |
| 2007/0109493 A1* | 5/2007 | Clerc | B29D 11/00432 |
| | | | 351/159.01 |
| 2008/0143004 A1* | 6/2008 | De Wilt | B29D 11/00442 |
| | | | 264/2.3 |
| 2010/0270721 A1 | 10/2010 | Liu | |
| 2013/0237630 A1* | 9/2013 | Morooka | C08F 222/10 |
| | | | 526/329 |

(Continued)

FOREIGN PATENT DOCUMENTS

| | | |
|---|---|---|
| CN | 107924066 A | 4/2018 |
| DE | 202008002919 U1 | 5/2008 |

(Continued)

OTHER PUBLICATIONS

International Search Report for International Application No. PCT/IB2021/062098, dated Apr. 12, 2022, 4 pages.

(Continued)

*Primary Examiner* — Mohammed A Hasan
(74) *Attorney, Agent, or Firm* — CANTOR COLBURN LLP

(57) ABSTRACT

An eyeglass lens with a decorative element includes a decorative element and/or a functional element glued at the concave part of the lens, the lens being made of a plastic material, the decorative element being arranged between the concave part of the lens and a further layer of polymeric material.

15 Claims, 1 Drawing Sheet

(56)                    References Cited

U.S. PATENT DOCUMENTS

| | | |
|---|---|---|
| 2015/0183173 A1 | 7/2015 | Linhardt et al. |
| 2015/0183175 A1* | 7/2015 | Sanders ................. B01D 71/80 |
| | | 264/177.17 |
| 2017/0368723 A1 | 12/2017 | Fäecke et al. |
| 2018/0003973 A1* | 1/2018 | Wade ....................... G02B 5/32 |

FOREIGN PATENT DOCUMENTS

| | | |
|---|---|---|
| DE | 102008020043 A1 | 10/2009 |
| DE | 102012222600 A1 | 6/2014 |
| EP | 2930013 A1 | 10/2015 |
| WO | 2020064879 A1 | 4/2020 |

OTHER PUBLICATIONS

Written Opinion for International Application No. PCT/IB2021/062098, dated Apr. 12, 2022, 5 pages.
Chinese Office Action for Application No. 202180086153.0, dated Apr. 25, 2025, 17 pages with translation.

* cited by examiner

EYEGLASS LENS WITH DECORATIVE ELEMENT

CROSS-REFERENCE TO RELATED APPLICATIONS

This application is a 35 U.S.C. § 371 National Stage patent application of PCT/IB2021/062098, filed on 21 Dec. 2021, which claims the benefit of Italian patent application 102020000032372, filed on 24 Dec. 2020, the disclosures of which are incorporated herein by reference in their entirety.

TECHNICAL FIELD

The present disclosure relates to an eyeglass lens with decorative insert. More particularly, the disclosure relates to an eyeglass lens having a decorative insert therein which is visible to the viewer of the lens.

BACKGROUND

As is well known, eyeglass lenses are often characterized by decorative elements aimed at characterising the aesthetics thereof.

In any case, the decorative element is an embellishment of the lens and makes the eyeglasses special from an aesthetic point of view, differentiating them from traditional eyeglasses.

In some cases, the decorative element, in addition to being an embellishment, "hides" a functional element, such as an RFID tag.

The application of the decorative element in a lens involves several problems due to the fact that although it is possible to apply the decorative element to the lens externally, gluing it to the convex external surface of the lens, such a solution would lead to premature damage to the decorative element, if not to its detachment from the lens.

Therefore, such a solution is impractical from an operational point of view, as well as being aesthetically unattractive, since the decorative element, if it were a metal letter or other decorative element preferably made of metal, plastic, composite or natural fibre material, would have a thickness which would be visible outside the lens with a decidedly unattractive aesthetic effect and a limited resistance to aggression from external agents. All the more so if this decorative element contains electronics.

State-of-the-art lenses made by inserting a decorated sheet or by non-uniform dispersion of decorative material (e.g., glitter) are known. However, these solutions do not make it possible, on the one hand, to ensure a high degree of durability of the decorated sheet, which could degrade and, on the other hand, to place very small decorative parts in a desired point of the lens.

State-of-the-art lenses are known to be made by gluing the decorative or functional element to a flat sheet, which is then permanently deformed and positioned in the mould to which a monomer is subsequently cast.

Such a solution has the disadvantage of deformation and/or possible damage to the decorative or functional element simultaneously with the deformation of the sheet on which it is applied, as well as greater residual stress at the end of the lens production cycle due to the cross-linking of the monomer into polymer.

SUMMARY

The main task of the present disclosure is to make an eyeglass lens, provided with an element for decorative or functional purposes, preferably but not exclusively of metal material, and that such a lens with said decorative element is preserved from damage.

In the context of this task, the present disclosure provides a high quality eyeglass lens in which the adhesive/gluing element is not visible from outside the lens and, on the contrary, appears totally integrated/incorporated in the lens body and which can be positioned precisely and accurately at a desired point of the lens.

The present disclosure also provides an eyeglass lens in which the decorative element does not degrade over time.

The present disclosure further provides an eyeglass lens in which the decorative element also has a functional purpose, such as a position identifier (RFID tag), or photochromic element, or in which the decorative element contains electronics.

The present disclosure also provides an eyeglass lens, in which the decorative element can be inserted directly in the lens making process, whether by injection moulding or casting polymer material.

A last but not least advantage of the present disclosure is to provide an eyeglass lens which is highly reliable, relatively simple to manufacture and competitively priced.

This task, as well as these and other advantages which will better appear hereafter, are achieved by providing an eyeglass lens with decorative element, characterized in that it comprises a decorative element glued at the concave part of the lens, said lens being made of plastic material, said decorative element being arranged between said concave part of the lens and a further layer of polymeric material.

BRIEF DESCRIPTION OF THE DRAWINGS

Further features and advantages of the disclosure will become clearer from the description of a preferred but not exclusive embodiment of an eyeglass lens according to the disclosure, illustrated by way of non-limiting example in the accompanying drawings, in which:

FIG. 3 illustrates the lens according to the present disclosure in sectional view; and FIG. 4 illustrates a further embodiment of the lens according to the present disclosure, in sectional view.

DETAILED DESCRIPTION OF THE DRAWINGS

Figures 1, 2:
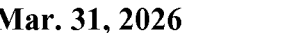
FIG. 1 illustrates in schematic, perspective, exploded view the lens according to the present disclosure.
FIG. 2 illustrates a perspective view of the lens in the assembled condition.

With reference to the figures, the eyeglass lens according to the present disclosure, globally indicated by reference numeral 1, comprises, in succession, looking from the outside of the lens towards the eye of the lens wearer, a lens made of plastic material 2, to which a decorative element preferably but not exclusively made of metal material 3, such as a letter, a decoration, an embellisher, a symbol or the like, is glued by means of a gluing element 4.

In particular, the expression 'plastic material' means a lens made entirely or at least partially of plastic material.

The plastic material can be transparent or coloured (also shaded).

The decorative element 3 is thus glued at the concave region of the lens 2 and preferably outside the centre/optical zone of the lens to allow the eyeglass wearer correct vision.

The assembly thus obtained between the plastic lens 2 and the decorative element 3 is covered by a further layer of plastic material 5, which is injected.

Suitably, the layer of polymeric material 2 is of thin thickness, for example 0.5 mm, and the decorative element is substantially two-dimensional.

According to a further embodiment, illustrated in FIG. 4, the lens 2 is a hybrid lens made of glass and plastic. In accordance with such an embodiment, the lens 2 comprises a first layer 21, made of glass, and a second layer 22, made of plastic. In particular, the first glass layer 21 faces outwards, i.e., it is placed at the convex part of the lens 2, and the second layer 22 faces the eye of the user, i.e., it is placed at the concave part of the lens 2.

In particular, the insertion and precise positioning of the decorative element occurs through the following steps:

preparing a lens body 2 preferably made of plastic material and previously curved so as to create a concave part and a convex part of the lens body;

gluing a decorative element 3 directly onto the curved lens body 2, at the concave part of the lens body;

inserting the lens body 2 into one of two half-cavities of a mould;

closing the mould and inserting a liquid polymer 5;

cooling;

opening the mould and removing the lens body 2 with the integrated decorative element 3.

The polymeric material 5 is suitably inserted in the injection mould.

The gluing of the decorative element 3 directly onto the curved lens body 2 can occur either automatically or manually.

In practice, it has been found that the lens with the decorative insert fully fulfils its task when the decorative element is incorporated therein, thus being protected from damage, and at the same time being perfectly visible from outside the lens.

The lens thus conceived is susceptible to numerous modifications and variations, all of which fall within the scope of the attached claims.

Furthermore, all the details can be replaced by other technically equivalent elements.

In practice, the materials used, as well as the contingent shapes and dimensions, may be any according to requirements and to the state of the art.

The invention claimed is:

1. An eyeglass lens with decorative element, wherein the lens comprises a decorative element glued at a concave part of the lens, said lens being made of plastic material, said decorative element being arranged between said concave part of the lens and a layer of polymeric material.

2. The lens according to claim 1, wherein said decorative element is a metal decorative element.

3. The lens according to claim 1, wherein said decorative element is an element of plastic material.

4. The lens according to claim 1, wherein said decorative element is a composite element or of natural fibre.

5. The lens according to claim 1, wherein said decorative element is a functional element.

6. The lens according to claim 5, wherein said decorative element is a functional element containing electronics.

7. The lens according to claim 1, wherein said decorative element is visible outside the lens.

8. The lens according to claim 1, wherein the polymeric layer is made of polycarbonate or polyamide.

9. The lens according to claim 6, wherein said polymeric layer is functionalising.

10. The lens according to claim 1, wherein said decorative element is glued using an adhesive.

11. The lens according to claim 1, wherein the decorative element is glued at the concave region of the lens and outside the centre/optical zone of the lens.

12. The lens according to claim 1, wherein said decorative element is substantially two-dimensional.

13. A method of making a lens for eyeglasses with decorative element, the method including the following steps:

preparing a lens body made of plastic material and previously curved so as to create a concave part and a convex part of the lens body, gluing a decorative element directly onto the curved lens body, at the concave part of the lens body, inserting the lens body into one of two half-cavities of a mould, closing the mould and inserting a liquid polymer, cooling, and opening the mould and removing the lens body with the integrated decorative element.

14. The method of making an eyeglass lens with decorative element according to claim 10, wherein the gluing of the decorative element directly onto the curved lens body is carried out in an automated manner.

15. The method of making an eyeglass lens with decorative element according to claim 10, wherein the gluing of the decorative element directly onto the curved lens body is carried out manually.

\* \* \* \* \*